US012467266B2

(12) United States Patent
Weber et al.

(10) Patent No.: US 12,467,266 B2
(45) Date of Patent: Nov. 11, 2025

(54) PORTABLE DANCE FLOOR

(71) Applicant: Hard Chill LLC, Brooklyn, NY (US)

(72) Inventors: Carl Weber, Brooklyn, NY (US); Joseph Louis Belverio, Jr., Fairfield, NJ (US)

(73) Assignee: Hard Chill LLC, Brooklyn, NY (US)

( * ) Notice: Subject to any disclaimer, the term of this patent is extended or adjusted under 35 U.S.C. 154(b) by 0 days.

(21) Appl. No.: 18/892,334

(22) Filed: Sep. 20, 2024

(65) Prior Publication Data

US 2025/0092690 A1 Mar. 20, 2025

Related U.S. Application Data

(60) Provisional application No. 63/539,556, filed on Sep. 20, 2023.

(51) Int. Cl.
*E04F 15/02* (2006.01)
*F21S 8/02* (2006.01)
*F21V 33/00* (2006.01)

(52) U.S. Cl.
CPC ........ *E04F 15/02172* (2013.01); *F21S 8/022* (2013.01); *F21V 33/006* (2013.01); *E04F 2290/026* (2013.01)

(58) Field of Classification Search
CPC .. F21V 15/02172; F21V 33/006; F21S 8/022; E04F 15/02172
USPC .......................................................... 362/153
See application file for complete search history.

(56) References Cited

U.S. PATENT DOCUMENTS

| | | | | | |
|---|---|---|---|---|---|
| 4,303,969 | A * | 12/1981 | Hamilton | E04F 15/105 | 362/153 |
| 4,329,739 | A * | 5/1982 | Loebner | F21S 8/032 | 40/406 |
| 4,340,929 | A * | 7/1982 | Konikoff | H02G 3/285 | 362/811 |
| 2009/0077918 | A1* | 3/2009 | Ban | E01C 5/005 | 52/588.1 |
| 2009/0217614 | A1* | 9/2009 | Cooper | E04F 15/02172 | 52/582.1 |
| 2022/0230565 | A1* | 7/2022 | Zhang | G09F 15/0012 | |

* cited by examiner

*Primary Examiner* — Thomas M Sember

(74) *Attorney, Agent, or Firm* — Tarter Krinsky & Drogin LLP

(57) ABSTRACT

The present disclosure relates to portable dance floors comprising, in various embodiments, one or more panels that can be rolled up for easy storage and transport; or one or more removably couplable panels that can be assembled and disassembled in modular configurations; or one or more panels that are connected with a hinge, such as a living hinge. The panels can comprise lightweight and durable materials that can be flexible or rigid, such that the portable dance floors can be easily stored, transported, and assembled or disassembled and dismantled by a single user or a low number of users. The present disclosure also relates to methods of assembling and disassembling or dismantling a portable dance floor.

6 Claims, 8 Drawing Sheets

PORTABLE DANCE FLOOR

CROSS-REFERENCE TO RELATED APPLICATIONS

The present application claims the benefit of U.S. Provisional Application No. 63/539,556 filed Sep. 20, 2023, the contents of which are incorporated by reference in their entirety.

BACKGROUND

The present disclosure relates to exemplary embodiments of a portable dance floor, such as a portable modular dance floor, which has the advantages of easy assembly, disassembly or dismantling, and easy transport from one location to another; as well as to methods of assembling and disassembling such a floor.

Dance floors disclosed in the prior art, especially dance floors incorporating a lighting element, are generally comprised of rigid materials to withstand continuous impact and protect the lighting element and circuitry within the dance floor. As a result, such dance floors are heavy, typically weighing between 500 and 1,000 pounds, and take up a large amount of space when stored. This presents significant challenges to purveyors of such dance floors when transporting, assembling, disassembling, and storing the dance floor. Frequently, a large team of workers, using a significant number of tools, is required to transport, assemble, and dismantle such dance floors. This can greatly increase labor and transportation costs, risk of injury, and inconvenience and delay.

An ongoing need exists for a portable dance floor that can be easily stored, transported, assembled, and disassembled by a single user, or a small number of users. Particular desirable is a lightweight portable dance floor that is made of either rigid or flexible sections that can be either assembled and disassembled (dismantled) quickly by putting together separate pieces (as in the case of a modular configuration), or rolled up when not in use (as in the case of a configuration that is not necessarily modular), thus minimizing the space required to store the floor. Particularly desirable is a floor that is durable enough to withstand the continuous impact and weight of multiple people dancing on it, but also is light and portable enough to significantly reduce the effort it takes to deploy the dance floor for use, and store it after use.

BRIEF SUMMARY

In certain embodiments, the present disclosure is directed to a portable dance floor comprising one or more removably couplable panels, the one or more removably couplable panels comprising (a) a base layer, (b) a top layer disposed over the base layer, and (c) a lighting element.

In certain embodiments, the base layer comprises (i) one or more channels extending in a downward direction from a top surface of the base layer, the one or more channels having a depth less than a thickness of the base layer, and (ii) one or more fasteners disposed on one or more surfaces of the base layer. In certain embodiments, the lighting element is disposed within the one or more channels of the base layer.

In certain embodiments, the one or more fasteners disposed on one or more surfaces of the base layer of a first removably couplable panel is configured to removably attach to one or more fasteners of a second removably couplable panel.

In certain embodiments, one or both of the base layer and the top layer of the removably couplable panels are comprised of a lightweight material that is flexible or rigid.

In certain embodiments, the lighting element is comprised of light emitting diodes.

In certain embodiments, the present disclosure is directed to a portable modular dance floor comprising: (a) a first panel having a substantially flat top surface, a bottom surface facing opposite the top surface, and a perimeter edge, the bottom surface comprising a recessed area defined by the perimeter edge and an interior support wall extending downward from the top surface; the perimeter edge comprising one or more apertures; (b) one or more fasteners configured to fit within the one or more apertures along the perimeter edge, and to releasably engage the one or more apertures with one or more corresponding apertures along a corresponding perimeter edge of a second panel to hold the first panel and the second panel adjacent to each other to form the modular floor; and (c) a lighting element disposed within the recessed area of the first panel.

In certain embodiments, the recessed area of the first panel includes a channel.

In certain embodiments, the lighting element comprises a wired connection disposed within the channel.

In certain embodiments, one or more of the apertures along the perimeter edge is configured to receive the wired connection of the lighting element, thereby extending the lighting element from the first panel to the second panel.

In certain embodiments, one or more of the fasteners comprises a center portion having a hole therethrough, such that the fastener can simultaneously releasably connect the first panel and second panel, and permit the wired connection of the lighting element to pass through the hole.

In certain embodiments, at least one of the first panel or the second panel comprises a transparent or translucent material through which light emitted from the lighting element is visible through the substantially flat top surface.

In certain embodiments, the portable modular dance floor further comprises a top layer disposed over the substantially flat top surface.

In certain embodiments, the portable modular dance floor further comprises a base layer disposed under the bottom surface. In certain embodiments, one or both of the top layer and the base layer comprises anti-skid material.

In various embodiments, the top surface is sufficiently durable as to withstand at least 50 pounds per square foot (0.35 psi or 2.4 kPa) without the need for an additional top layer.

In certain embodiments, the present disclosure is directed to a method of assembling a portable modular floor comprising the first panel and second panel comprises the steps of (a) disposing the first panel on a substantially flat surface; and (b) fitting the one or more fasteners into the one or more apertures disposed along the perimeter edge of the first panel and the corresponding one or more apertures disposed along the perimeter edge of the second panel to assemble the portable modular floor; wherein the assembling is accomplished by fewer than three (3) individuals without the need for additional mechanical assistance.

In certain embodiments, the present disclosure is directed to a method of disassembling a portable modular floor comprising the first panel and second panel comprises the steps of (a) removing the one or more fasteners disposed along the perimeter edge of the first panel and connecting the first panel to the second panel, to separate the first and second panel from each other; (b) stacking the first panel and the second panel; and (c) transporting the stacked first panel and second panel to a different location; wherein the disassembling is accomplished by fewer than three (3) individuals without the need for additional mechanical assistance.

In certain embodiments, the present disclosure is directed to a portable modular floor comprising: (a) first and second panels having a substantially flat top surface, a bottom surface facing opposite the top surface, and a perimeter edge, the bottom surface comprising a recessed area defined by the perimeter edge and an interior support wall extending downward from the top surface; the perimeter edge comprising one or more apertures; the first and second panels configured adjacent to each other and connected along a portion of each of the first and second panel's perimeter edges by a living hinge to form the modular floor; and (b) a lighting element disposed within the recessed area of the first panel.

In certain embodiments, the present disclosure is directed to a portable dance floor comprising:

(a) first and second panels having a substantially flat top surface, a bottom surface facing opposite the top surface, and a perimeter edge, the bottom surface comprising a recessed area defined by the perimeter edge and an interior support wall extending downward from the top surface; the perimeter edge comprising one or more apertures; the first and second panels configured adjacent to each other and connected along a portion of each of the first and second panel's perimeter edges by a living hinge to form the portable modular dance floor; and (b) aa lighting element disposed within the recessed area of the first panel.

BRIEF DESCRIPTION OF THE DRAWINGS

Exemplary embodiments of the present disclosure will be described with references to the accompanying Figures, wherein.

DETAILED DESCRIPTION

The exemplary embodiments of the present disclosure can provide for, in various embodiments, a portable dance floor in general, or a portable modular dance floor more particularly. Exemplary embodiments of the various methods and apparatuses will now be described with reference to the Figures. The following description of the various embodiments is merely exemplary in nature and is in no way intended to limit the scope of the disclosure, its application, or uses.

As used herein, "portable" means capable of being transported by a single individual or a small group of individuals, without the need for specialized equipment or power either to put together, dismantle, or transport. For example, in certain embodiments, the lightweight portable dance floors herein can be set up and dismantled by a single person and easily transported from one point to another in a single trip. In other embodiments, a floor herein can be assembled or disassembled by fewer than three (3) individuals without the need for additional mechanical assistance. As used herein, "additional mechanical assistance" means mechanical tools and power tools typically used for installing or removing flooring such as hammers, saws, cutters, spacers, trowels, nailers, crowbars, scrapers, rollers, nailers, pins, nails, screws, adhesives, or the like. In certain embodiments, a floor herein can be easily assembled and disassembled at a location (either a storage location or a venue such as a wedding or party), in that one or a small group of individuals can roll or unroll the panels (either separate or together), or can assemble or disassemble the panels and then stack them for transport (either by carrying manually or by loading them into a vehicle) to another location.

As used herein, "lightweight" means weighing no more than can be easily carried by hand by an adult of average size, without the need for assistance by another individual or an item such as a wagon or lift. As used herein, "rigid" means being not easily deformed (as visible to the naked eye) upon the application of normal manual force by an adult of average size, without further mechanical assistance; "flexible" means the opposite (that is, visibly deformed to the naked eye).

Throughout the present disclosure, when described in sequential words (for example, using "then" or "next"), such description is not limiting to the described steps in the particular order set forth, but also includes embodiments wherein the steps are presented in any order. As used herein, the term "or" as used herein means any one or more of the alternatives, including all of the alternatives.

Figure 1B:
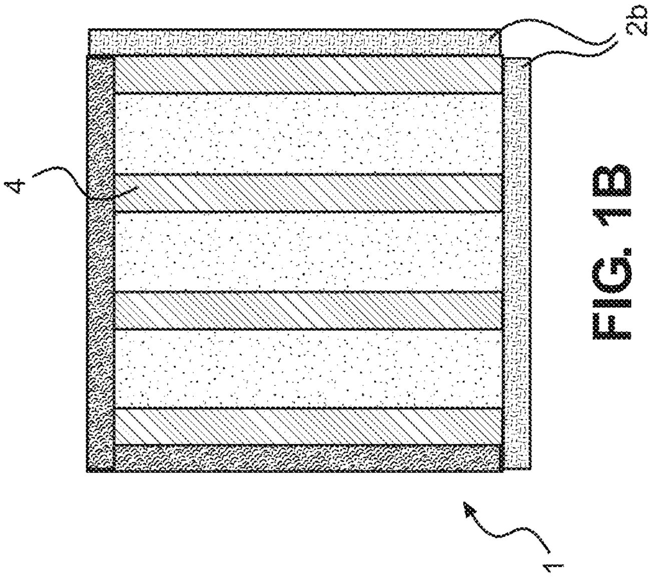
FIG. 1B shows the bottom of panel of a floor according to an embodiment herein.
Figure 1A:
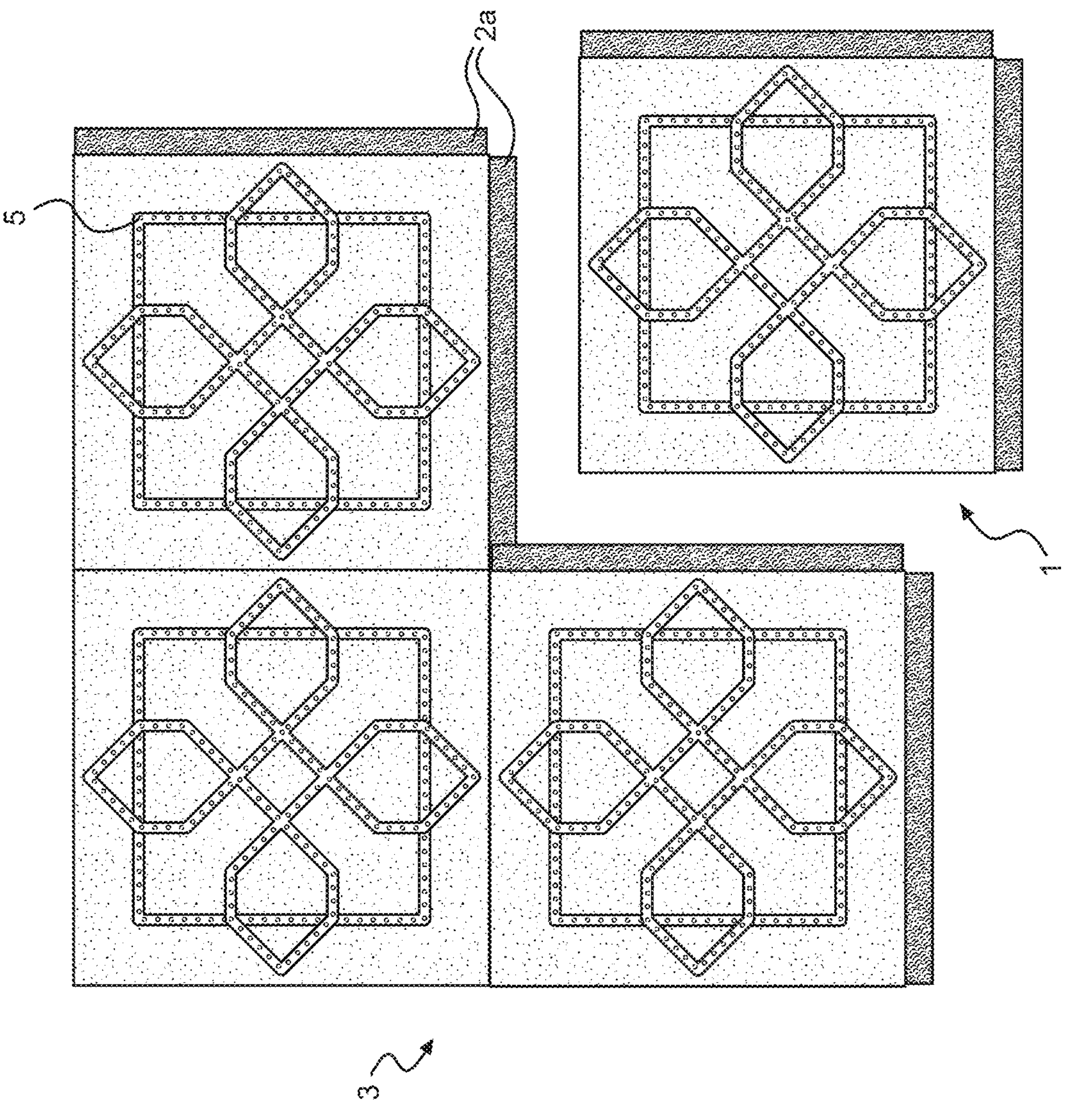
FIG. 1A shows a floor and panels according to an embodiment herein.

FIG. 1A illustrates a top view of a portable dance floor 3 according to an exemplary embodiment of the present disclosure. In various embodiments, the portable dance floor 3 herein comprises one or more removably couplable panels 1. As can be seen in the embodiment shown in FIG. 1A, a panel 1 can have a hook and loop fastener male side strip 2*a* along one or more edges. As shown in FIG. 1B, a panel 1 can also have a hook and loop fastener female side strip or edge 2*b* along one more edges, configured in such a way that adjacent panels 1 can be fastened together when in use. In various embodiments, the configuration of male edges 2*a* and female edges 2*b* can be in any pattern, and need not be shown specifically as in FIGS. 1A and 1B—that is, the male edges 2*a* are shown on the lower right of the panels and the female edges 2*b* on the lower left of the panels; however, the embodiments are not so limited, so far as the panels 3 are configured in a way that permits them to be removably attached together.

In certain embodiments as shown in FIG. 1A, the lighting element 5 is at least partially visible to the user upon looking down at the panel, either through a transparent or translucent interface. As shown further in FIG. 1B, in certain embodiments, a panel 1 herein can, as shown on its underside (opposite side of the side on which users can dance), comprise one or more portions (here, stripes) of an anti-skid or friction-inducing material 4. In various embodiments, this material can comprise rubber or a polymer, or material having a rough surface, such as sandpaper, and can serve to keep the dance floor 3 in place during use and avoid slippage of the dance floor 3. In other embodiments, the anti-skid material can be disposed on the top side of the panel to provide further safety and anti-slip characteristics to the side on which the users dance.

In various embodiments, the panels herein can be joined together or removed, as illustrated herein, to form a dance floor of a desirable dimension. The panels herein can have any desirable dimensions, for example, between 3×3 feet (0.9×0.9 meters) and or 5×5 feet (1.5×1.5 meters). The dimension of the dance floor herein can vary based upon the number of panels joined together—for example, a dance floor comprised of a plurality of 4×4 foot (1.2×1.2 meter) panels may form a 8×8 foot (2.4×2.4 meter), 12×12 foot (3.7×3.7 meter) or 16×16 foot (4.9×4.9 meter) dance floor. However, it should be noted that the panels herein need not be uniformly square or any particular shape, and can be configured in any manner that is desirable to the user.

In various embodiments, the thickness of a panel herein, or of a portable floor herein, can be 0.25 to 2 inches (0.6 to 5 centimeters), 0.3 to 1.5 inches (0.8 to 3.8 centimeters) or 0.5 to 1.5 inches (1.3 to 3.8 centimeters), or 0.4 to 2 inches (1 to 5 centimeters), or 0.5 to 2.5 inches (1.3 to 6.5 centimeters).

Figure 2:
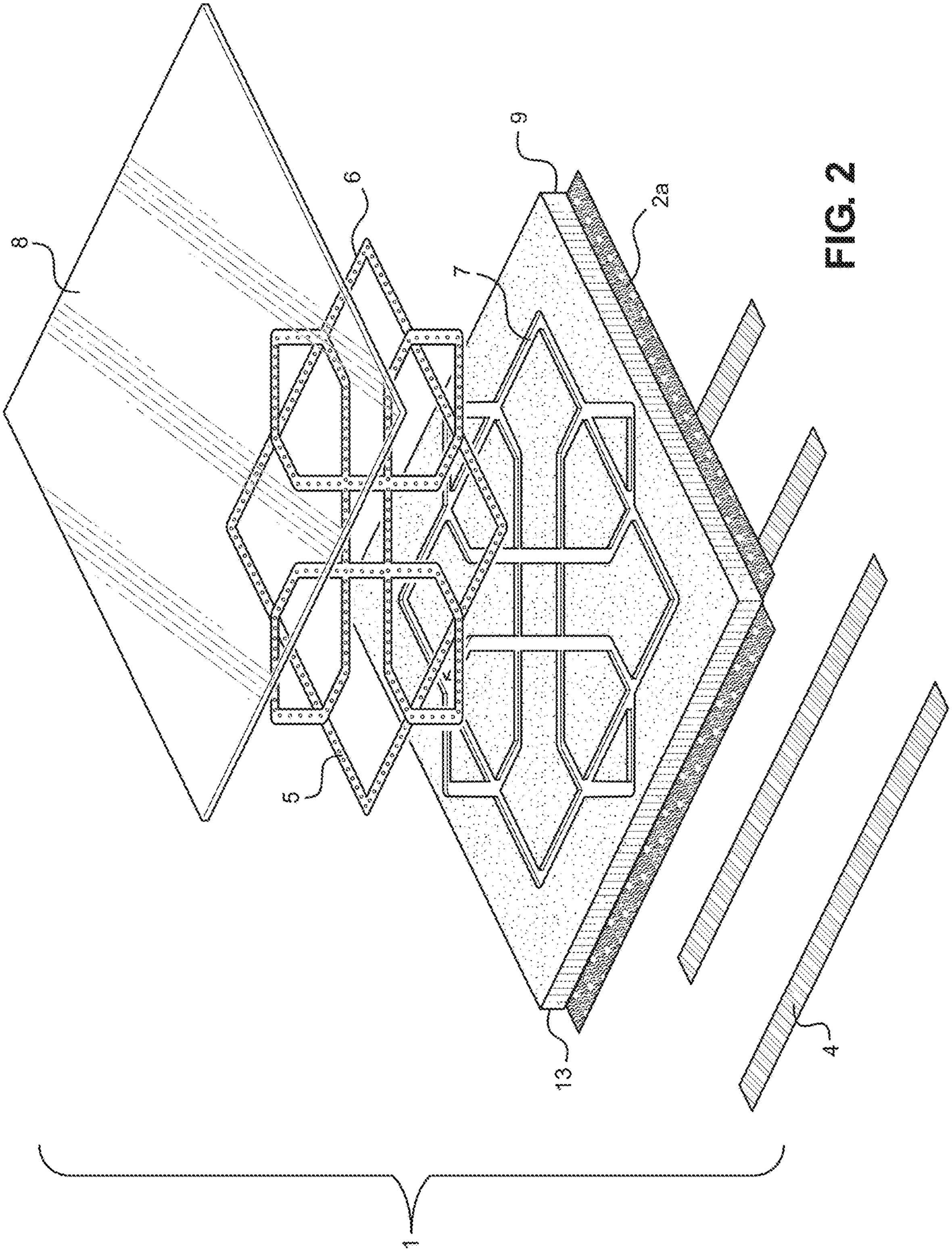
FIG. 2 shows an exploded view of a panel according to an embodiment herein.

FIG. 2 illustrates an exploded view of one of the plurality of panels 1 of a portable dance floor 3 herein. In various embodiments, a panel herein can comprise a base layer 9 and a top layer 8, with a perimeter edge 13 marking the thickness of the base layer. In various embodiments, one or more of the panels 1 herein can comprise a lighting element 5, including but not limited to light emitting diode ("LED") strips (also referred to as ribbon LEDs or rope lights). In various embodiments, the lighting element 5 disclosed herein can include one or more of the following features: changing the color of the light emitted; adjusting the brightness of the light emitted; flashing the light emitted in a pattern, or synchronizing the light emitted to the rhythm of sound or music with a sensitivity adjustable microphone. As shown in FIG. 2, the lighting elements 5 can be configured in the form of a light cable 6.

In certain embodiments, the base layer 9 of one or more panels herein can comprise one or more channels 7 that extend downward from a top surface of the base layer in a direction of a thickness of the base layer. In such embodiments, the lighting element 5 of a panel can be disposed within the one or more channels 7 herein. In various embodiments, the depth of a channel 7 can be less than the thickness of the base layer 9, such that the channel does not extend entirely through the base layer but is able to accommodate the dimensions of the selected lighting element. The channels can form any pattern that is desirable to a manufacturer or user. I other embodiments, a channel is on the underside of the base layer and extends upward, such that any light element disposed therein can be at least partly visible when viewing the panel from the top down.

In certain embodiments, a top layer 8 is disposed over, and substantially covers, the base layer of a panel herein, such that a lighting element 5 disposed within a channel 7 of the base layer is enclosed within the panel 1. In various embodiments, at least a portion of the top layer 8 is transparent or translucent to permit light emitted from the lighting element to pass through it; or alternatively, it can be opaque in various portions. As used herein, "transparent" means allowing light to pass through without appreciable scattering, such that objects on the other side can be seen substantially clearly to the naked eye, as with material that has a single index of refraction. As used herein, "translucent" means allowing light to pass through with scattering, such that objects on the other side are visible but cannot be seen substantially clearly to the naked eye, as with material having different indices of refraction (in certain embodiments, a "frosted" effect). As used herein, "opaque" means not allowing light to pass through as discernible to the naked eye.

In various embodiments, the top layer is attached to the base layer with, for example, an adhesive, magnets, snaps, or hook and loop fastener strips (e.g., Velcro®).

In various embodiments, the base layer 9 of a panel herein can further comprise one or more fasteners to removably attach one or more other removably couplable panels. It is to be understood that any fastener, or combination of fasteners, that can releasably couple adjacent panels can be used, including but not limited to hook and loop strips (e.g., snap and hood fasteners such as Velcro®), magnets, snaps, or the like. In certain embodiments, the one or more fasteners can be disposed on one or more surfaces of the base layer, including but not limited to the bottom surface or the edges of the base layer. For example, as shown in FIGS. 1A-1B, in certain embodiments hook and loop strips (e.g., Velcro®) **2*a* (male) and 2*b*** (female) can be disposed along any portion of the perimeter of the bottom surface of the base layer.

In various embodiments, rubber or similar friction-inducing material 4 can be disposed on a portion of the top surface of the top layer 8 or the bottom surface of the base layer 9 of a panel herein to provide anti-skid properties.

Figure 3A:
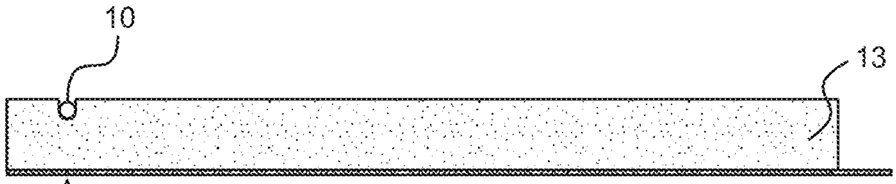
FIGS. 3A and 3B show side and top views of a panel according to an embodiment herein.
Figure 3B:
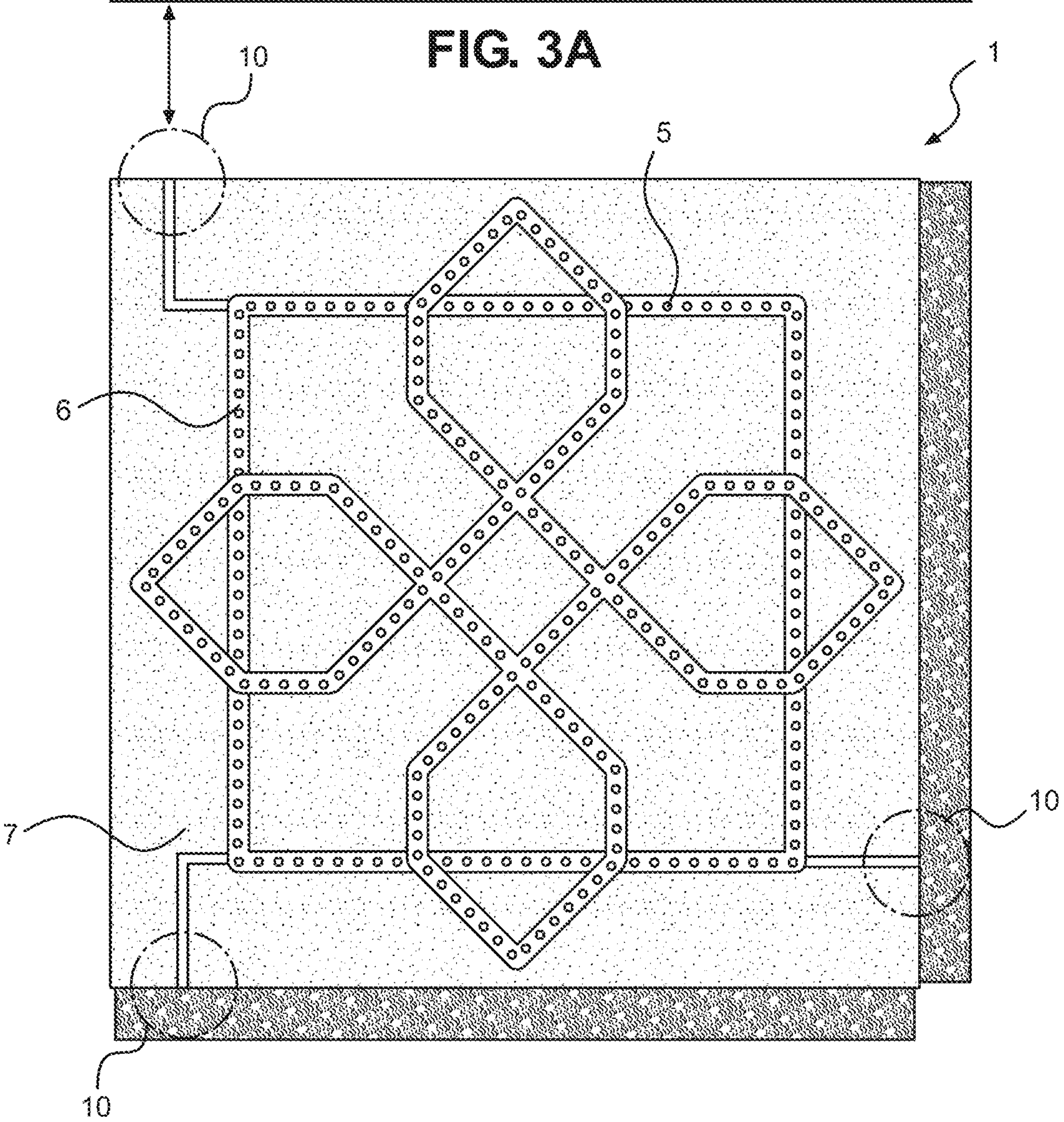

In various embodiments, for example as shown in FIG. 3B, a channel 7 of the base layer 9 of one or more panels 1 herein can extend to the edge of the perimeter of the base layer 9. Such channels 7 can allow a wired connection of the lighting element 5, such as a light cable 6, to extend out of the base layer to permit, for example, connection of the lighting element to an external power supply unit (e.g., USB adapter, AC adapter), a lighting element of an adjoining panel, or a remote-control receiver to permit a user to control the lighting element with a remote-control transmitter.

As shown further in FIG. 3A and FIG. 3B, in certain embodiments, a panel can include a plug placement 10 that permits assembly of multiple panels by joining multiple light cables 6 across such multiple panels, to create an overall pleasing pattern of lighting. FIG. 3A shows the cross-section of such a configuration, wherein the plug placement 10 acts as a connector between two panels.

Figure 4:
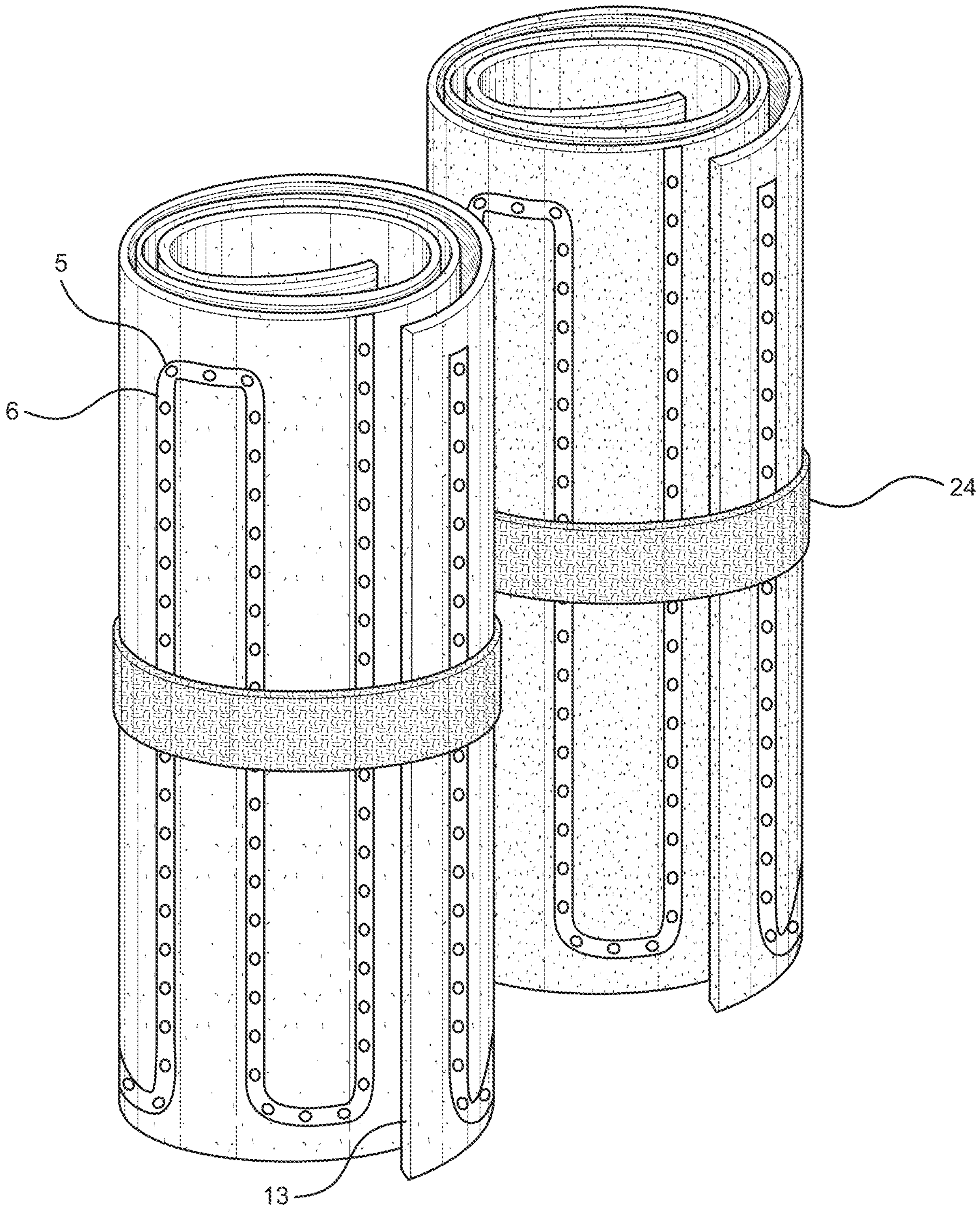
FIG. 4 shows a portable dance floor according to an embodiment herein, in a rolled up condition.

In certain embodiments, one or both of the base layer 9 and the top layer 8, or any other part of a panel or portable floor herein can comprise any lightweight material, including but not limited to any polymer such as Polypropylene, Poly Etheline, ABS, polyamide, acrylic, or polystyrene (including, e.g., high-density closed cell polyethylene foam). In certain embodiments, such material is lightweight, flexible, rigid, or durable. Various advantages can be provided by the use of such materials, including but not limited to, providing panels able to withstand the weight and impact of multiple adults for extended periods of time, while permitting the portability of the panels comprising the dance floor. Moreover, in reference to the embodiments shown in FIG. 4, a top layer and bottom layer comprised of such material, whether flexible or rigid, can further permit a user to stack the panels upon themselves, or roll them up, for additional portability and easy storage when the dance floor is not in use. FIG. 4 shows a rolled-up floor in accordance with certain embodiments herein, when not in use. As can be seen therein, one advantage of the technology herein is that it provides for easy assembly, disassembly and storage of a floor herein. In certain embodiments, a floor herein can comprise just a single panel that can be rolled up easily for transport and storage, or alternatively, multiple panels that can be separated from each other and each individually rolled up for transport and easy storage, or stacked together. In the embodiment shown in FIG. 4, the lighting elements 5, which as shown here are in the form of a light cable 6, can be removed from the channels in which they are held, or alternatively can be left in the channels during storage and transport. Further, in certain embodiments, a band 24 can be used to hold together a rolled up panel or floor for transport and storage, but when removed, will not deform the panel or floor, so that it lies flat for easy use.

Figure 5:
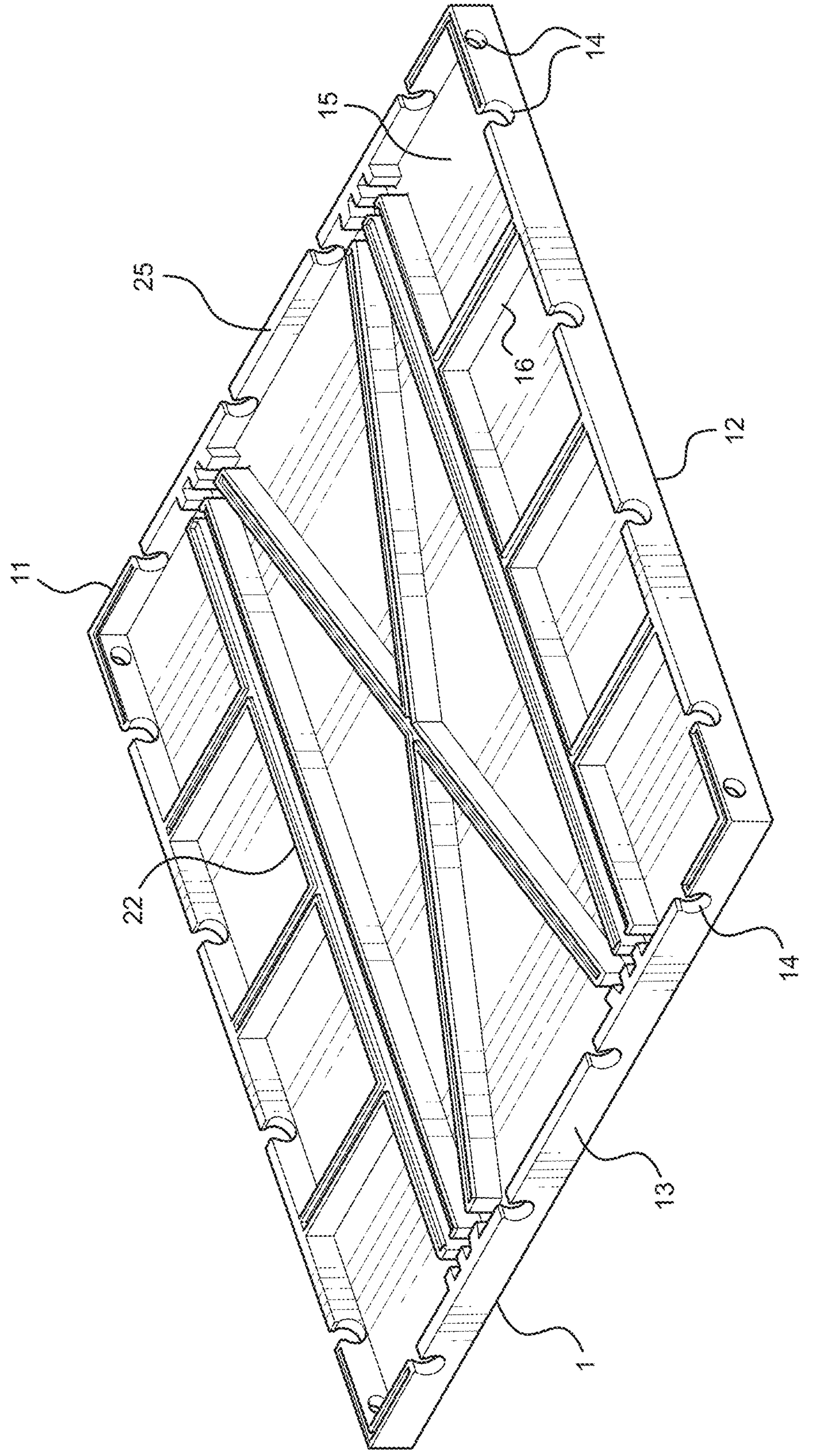
FIG. 5 shows a bottom-up view of a panel according to another embodiment herein.

FIGS. 5 through 8 illustrate further embodiments of the technology herein, wherein a portable modular floor comprises a first panel 1 having, among other features, a bottom surface comprising a recessed area. In particular, FIG. 5 shows another embodiment of a panel as described herein, shown with the bottom surface 11 facing upward to demonstrate the recessed portions, and the top surface 12 facing downward, all for ease of reference and illustration of the embodiment shown.

As can be seen in FIG. 5, in certain embodiments the top surface 12 is the surface that users will contact with their feet while dancing, and the bottom surface 11 is the surface that contacts the ground when the modular floor is in use. In the embodiment shown here, the perimeter edge 13 further includes one or more apertures 14. The recessed area 15 defined by both the perimeter edge 13, and an interior wall 16 that extends downward from the top surface 12. In various embodiments, the recessed area includes a channel; or itself defines a channel.

Further, in certain embodiments, one or more channels 22 are present in the underside of the panel 1, and also extend downward from the top surface, as do the perimeter edge 13 and the interior wall 16.

In certain embodiments, the channels can enclose one or more lighting elements 5. In FIG. 5, such lighting elements may not be visible, as they could be, in certain embodiments, enclosed within the channels or so deep within the recesses of the channels that they cannot be seen readily from the underside of the panel.

Figure 6:
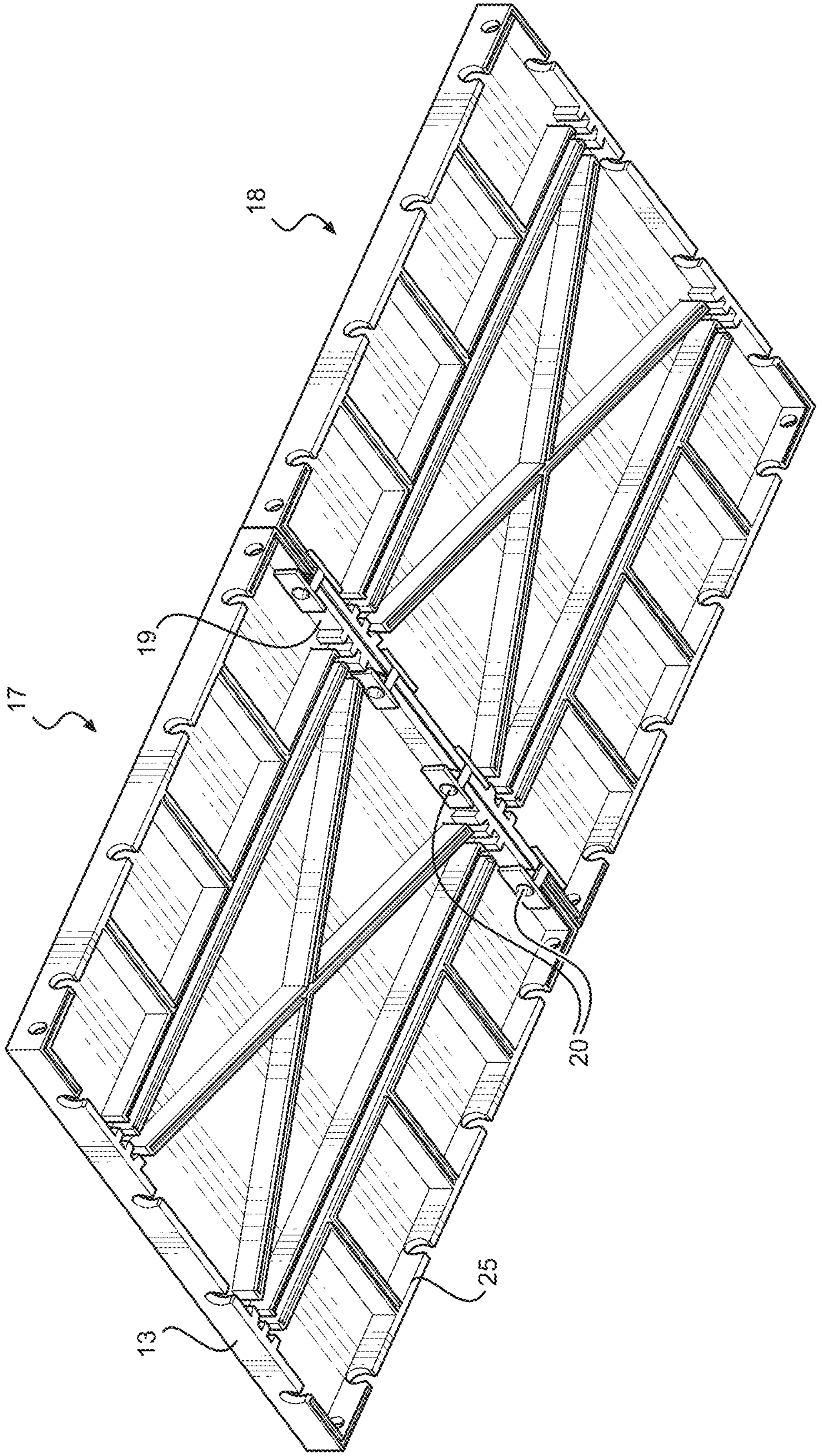
FIG. 6 shows a floor according to an embodiment of a portable floor herein, including two panels connected to each other, viewed from underneath the portable floor.

FIG. 6 shows another embodiment of a modular floor as described herein, with a first panel 17 connected to a second panel 18. For ease of reference, FIG. 6 shows a view of a floor herein from beneath the floor, looking up to its bottom surface.

In certain embodiments, the first panel 17 and second panel 18 contact each other through a connected surface 19. In certain embodiments, the connected surface comprises a hinge, such as, for example, a removable hinge (which can be separated from the two panels during disassembly of the modular floor), or a living hinge. As used herein, "living hinge" means a thin, flexible section of material that connects two parts made of the same material, allowing them to bend, fold, and rotate. In certain embodiments, if a living hinge is present in a floor herein, assembly and disassembly can be easily performed by folding up the floor along one or more living hinges, instead of (or in addition to) separating the panels from each other to stack or roll.

Figure 7:
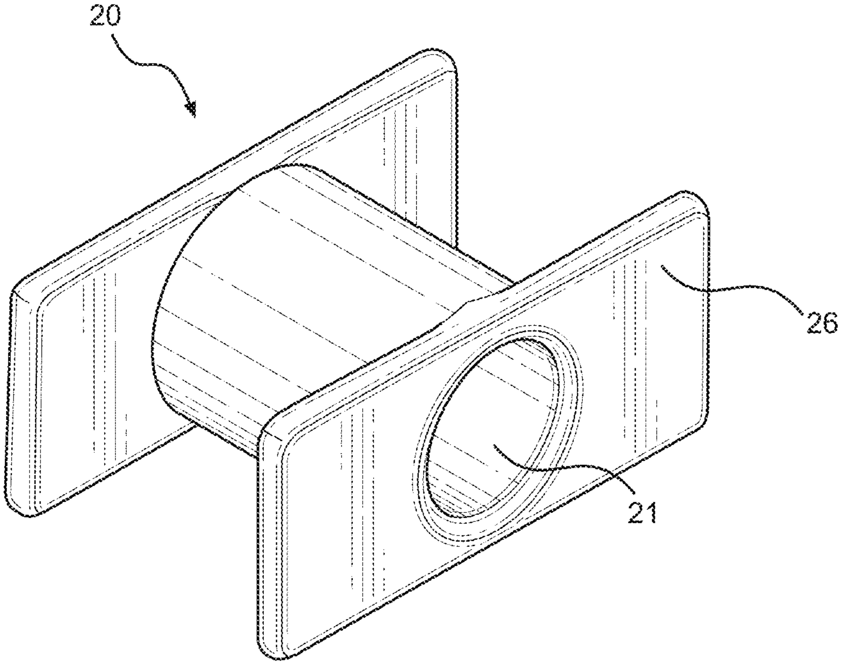
FIG. 7 shows a fastener according to an embodiment herein.

In other embodiments, the first panel 17 and second panel 18 are connected to each other releasably, through one or more fasteners 20. FIG. 7 shows a close-up of a fastener 20, which has a hole 21 through which a wired connection 6 of a lighting element 5 can pass, thereby extending the lighting element from the first panel to the second panel. The hole 21 an, in other embodiments, be useful to allow any other item to pass that may further contribute to the desirability of a floor herein, including a sound cable or any other device or mechanism. In the embodiment shown in FIG. 7, the fastener 20 also contains winged portions 26 that protrude from the fastener and serve to engage the interior of the panel by holding it in place when they contact the interior of the perimeter edge 13. In certain embodiments, the presence of the hole 21 means that the fastener 20 can simultaneously releasably connect the first panel 17 and the second panel 18, and also permit the wired connection of the lighting element to pass through the hole, allowing for a seamless lighting experience across multiple panels of the floor.

Figure 8:
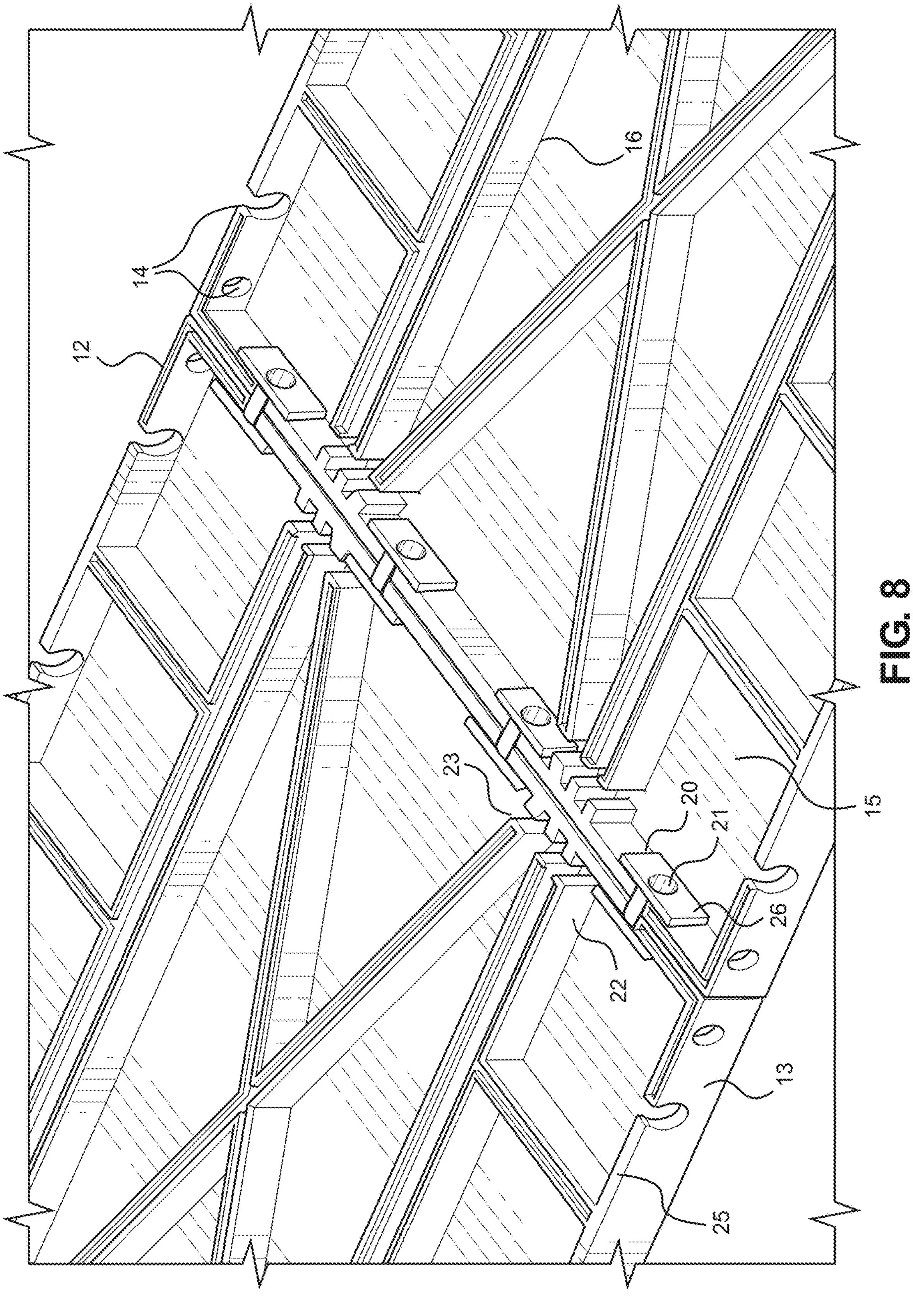
FIG. 8 shows, in closer detail, the connection between panels according to a bottom-view of an embodiment herein.

FIG. 8 shows a further close-up of the releasable connection portion between the first panel and second panel, demonstrating how the fastener 20, with its hole 21, can be releasably used to attach the two panels. When inserted into an aperture 14, the winged portions 26 can engage the interior of the perimeter edge, in such a manner that the hold is sufficient to withstand the impacts from dancing, but can be easily separated by ordinary manual force—that is, the application of human hands without the assistance of further mechanical force such as that provided by tools.

In certain embodiments, the lighting element can be contained within one or more channels 22, but it is important to note that there is no limitation on where the lighting element can be disposed within the bottom surface of a panel. That is, in certain embodiments, a lighting element can be disposed in a space 23 on the end of a channel 22; for example, a wired connection 6 can be held within that space, and its end can be strung through the hole 21 of a fastener to proceed within an adjacent panel. In other embodiments, a lighting element can be contained partly or entirely within any recessed area 15 on the underside of the top surface of the panel, as may be desired by the user, e.g., for visual effect or further stability.

In certain embodiments, a portable floor herein comprises one or more panels connected together, without the need for any additional layers—that is, in various embodiments, no top surface, or no bottom surface to engage the ground. In such embodiments, the top surface of the panels can be durable enough to withstand multiple blows by the feet of dancers without the need for any additional layers of material. In other embodiments, the bottom surface of the panels may itself be made of material that is anti-slip enough to withstand slippage of the panels on the ground during use, without the need for any further anti-slip material or layer. Further, referring to FIGS. 6 and 8, in certain embodiments, the portion 25 of the perimeter edge 13 that contacts the ground (or any surface below the panels) can be made of anti-skid material, or covered partly or fully with anti-skid material.

In various embodiments, a single panel herein weighs less than 5 kilograms (11 pounds), less than 4 kilograms (8.8 pounds), less than 3 kilograms (6.6 pounds), or 2 to 3 kilograms (4.4 to 6.6 pounds). In various embodiments, the sum of the weight of all panels in the portable modular floor is less than 100 kilograms (220 pounds), less than 90 kilograms (198 pounds), less than 80 kilograms (176 pounds), less than 70 kilograms (154 pounds), less than 60 kilograms (132 pounds, less than 50 kilograms (110 pounds), or less than 40 kilograms (88 pounds).

In various embodiments, a panel or floor herein, or the top surface of a panel or a portable floor herein, is sufficiently durable as to withstand a pressure of at least 50 pounds per square foot (0.35 psi or 2.4 kPa), or at least 75 pounds per square foot (0.52 psi or 3.6 kPa), or at least 100 pounds per square foot (0.70 psi or 4.8 kPa), with or without the need for an additional top layer. As these are units of pressure, and Pressure=force divided by area, the force that a panel or floor herein can withstand, can be calculated based on the total area of the dance floor.

Impacts on Dance Floor

In other embodiments, a panel or floor herein exhibits superior resistance to impact, and also has the advantage of staying in place without shifting over long periods of time in active use, e.g., the length of a party, wedding or other event (for example, up to 24 hours, up to 18 hours, up to 12 hours or up to 6 hours). In various embodiments, when measuring the amount of pressure or force a panel or floor herein can withstand, these values can be measured based on a sustained impact of 30 seconds or 60 seconds, or intermittent impact over a period of 2 hours, 4 hours, 6 hours, or 12 hours.

In an exemplary embodiment, a panel herein has the following features:

Surface and back materials: PA
Voltage: AC 90 to 240V, 50/60 Hz
Power: Maximum 4 W
Light source: 5050 RGB chip
Number of lamp beads: 20 to 30/piece
Color: RGB full color
Control: music controller
Life: ≥50,000 hours
Power supply: 5 to 10V USB
Weight: about 2.5 to 3 kg
Size: L 60 to 70 cm×W 60 to 70 cm×H 1 to 5 cm Although the present technology has been described in relation to embodiments thereof, these embodiments and examples are merely exemplary and not intended to be limiting. Many other variations and modifications and other uses will become apparent to those skilled in the art. The present technology should, therefore, not be limited by the specific disclosure herein, and can be embodied in other forms not explicitly described here, without departing from the spirit thereof.

We claim:

1. A portable dance floor comprising one or more removably couplable panels, the one or more removably couplable panels comprising:
(a) a base layer comprising:
(i) one or more channels extending in a downward direction from a top surface of the base layer, the one or more channels having a depth less than a thickness of the base layer; and
(ii) one or more fasteners disposed on one or more surfaces of the base layer;
(b) a top layer disposed over the base layer; and
(c) a lighting element;
wherein the lighting element is disposed within the one or more channels of the base layer.

2. The dance floor of claim 1, wherein the one or more fasteners disposed on one or more surfaces of the base layer of a first removably couplable panel is configured to removably attach to one or more fasteners of a second removably couplable panel.

3. The dance floor of claim 1, wherein one or both of the base layer and the top layer of the removably couplable panels are comprised of a lightweight material that is flexible or rigid.

4. The dance floor of claim 1, wherein the lighting element is comprised of light emitting diodes.

5. A method of assembling a portable dance floor comprising the first panel and second panel of claim 1, the method comprising the steps of:
(a) disposing the first panel on a substantially flat surface; and
(b) fitting the one or more fasteners into the one or more apertures disposed along the perimeter edge of the first panel and the corresponding one or more apertures disposed along the perimeter edge of the second panel to assemble the portable modular floor;
wherein the assembling is accomplished by fewer than three (3) individuals without the need for additional mechanical assistance.

6. A method of disassembling a portable modular dance floor comprising the first panel and second panel of claim 1, the method comprising the steps of:
(a) removing the one or more fasteners disposed along the perimeter edge of the first panel and connecting the first panel to the second panel, to separate the first and second panel from each other;
(b) stacking the first panel and the second panel; and
(c) transporting the stacked first panel and second panel to a different location;
wherein the disassembling is accomplished by fewer than three (3) individuals without the need for additional mechanical assistance.

* * * * *